(12) United States Patent
Zilka

(10) Patent No.: US 8,364,081 B1
(45) Date of Patent: Jan. 29, 2013

(54) SYSTEM, METHOD, AND COMPUTER PROGRAM PRODUCT FOR USING A CELLULAR PHONE AS AN INTERFACE FOR A VOIP-EQUIPPED COMPUTER

(75) Inventor: Kevin J. Zilka, San Jose, CA (US)

(73) Assignee: Stragent, LLC, Longview, TX (US)

( * ) Notice: Subject to any disclaimer, the term of this patent is extended or adjusted under 35 U.S.C. 154(b) by 1683 days.

(21) Appl. No.: 11/180,991

(22) Filed: Jul. 12, 2005

Related U.S. Application Data

(60) Provisional application No. 60/587,343, filed on Jul. 12, 2004.

(51) Int. Cl.
*H04B 7/00* (2006.01)
*H04M 1/00* (2006.01)

(52) U.S. Cl. .................. 455/41.2; 455/569.1
(58) Field of Classification Search ........ 455/41.1–41.3, 455/569.1
See application file for complete search history.

(56) References Cited

U.S. PATENT DOCUMENTS

| | | | |
|---|---|---|---|
| 5,771,355 A | 6/1998 | Kuzma | 709/232 |
| 6,396,513 B1 | 5/2002 | Helfman et al. | 715/752 |
| 6,629,129 B1 | 9/2003 | Bookspan et al. | 709/204 |
| 7,472,351 B1 | 12/2008 | Zilka | 715/748 |
| 7,702,728 B2 | 4/2010 | Zaner et al. | 709/205 |
| 2002/0111140 A1* | 8/2002 | Kim | 455/41 |
| 2003/0162544 A1* | 8/2003 | Austin et al. | 455/445 |
| 2004/0078448 A1 | 4/2004 | Malik et al. | 709/206 |
| 2004/0116120 A1* | 6/2004 | Gallagher et al. | 455/436 |
| 2004/0131078 A1* | 7/2004 | Gupta et al. | 370/466 |
| 2004/0137967 A1 | 7/2004 | Bodley | 455/575.2 |
| 2004/0146021 A1* | 7/2004 | Fors et al. | 370/331 |
| 2004/0266404 A1 | 12/2004 | Nasu et al. | 455/414.1 |
| 2004/0267871 A1 | 12/2004 | Pratley et al. | 709/200 |
| 2005/0086309 A1 | 4/2005 | Galli et al. | 709/206 |
| 2005/0108338 A1 | 5/2005 | Simske et al. | 709/206 |
| 2005/0131900 A1 | 6/2005 | Palliyll et al. | 1/1 |
| 2005/0271020 A1* | 12/2005 | Thermond | 370/338 |
| 2006/0062400 A1 | 3/2006 | Chia-Chun | 381/74 |
| 2006/0101119 A1 | 5/2006 | Qureshi et al. | 709/206 |

FOREIGN PATENT DOCUMENTS

| WO | WO 02/01823 A2 | 1/2002 |
|---|---|---|
| WO | WO 02/073886 | 9/2002 |

OTHER PUBLICATIONS

Office Action Summary from U.S. Appl. No. 11/828,012 mailed on Apr. 30, 2009.
Lotus white paper "real-time collaboration with lotus sometime" (Jan. 2001).
Microsoft Word 2003, "How to track and manage changes in a word 2002 and a word 2003 document", 2003, pp. 1-5.
Examiner's Answer from U.S. Appl. No. 12/413,676 dated Jan. 30, 2012.
Office Action from U.S. Appl. No. 11/119,461 dated Apr. 10, 2008.
Office Action from U.S. Appl. No. 11/119,461 dated Jul. 17, 2008.
Office Action from U.S. Appl. No. 11/119,461 dated Sep. 18, 2007.

(Continued)

*Primary Examiner* — Steven Lim
(74) *Attorney, Agent, or Firm* — The Caldwell Firm, LLC; Patrick E. Caldwell, Esq.

(57) ABSTRACT

A system, method and computer program product are provided. Included is a cellular phone capable of communicating via a long-range cellular network protocol and a short-range protocol. Further included is a computer system capable of communicating via a long-range hard-line network protocol and the short-range protocol. Thus, when the cellular phone is in the proximity of the computer system, the cellular phone communicates with the computer system utilizing the short-range protocol, so that the cellular phone is used to communicate via the long-range hard-line communication network protocol.

97 Claims, 3 Drawing Sheets

OTHER PUBLICATIONS

Office Action from U.S. Appl. No. 11/119,461 dated Nov. 26, 2008.
Office Action from U.S. Appl. No. 11/828,003 dated Apr. 27, 2009.
Office Action from U.S. Appl. No. 11/828,003 dated May 1, 2008.
Office Action from U.S. Appl. No. 11/828,003 dated Oct. 2, 2008.
Office Action from U.S. Appl. No. 11/828,012 dated Apr. 30, 2009.
Office Action from U.S. Appl. No. 11/828,012 dated May 1, 2008.
Office Action from U.S. Appl. No. 11/828,012 dated Oct. 2, 2008.
Office Action from U.S. Appl. No. 12/413,676 dated May 6, 2011.
Office Action from U.S. Appl. No. 12/413,676 dated Dec. 1, 2010.
U.S. Appl. No. 11/119,461, filed Apr. 29, 2005.
U.S. Appl. No. 11/828,003, filed Jul. 25, 2007.
U.S. Appl. No. 11/828,012 Jul. 25, 2007.
U.S. Appl. No. 12/413,676, filed Mar. 30, 2009.

* cited by examiner

SYSTEM, METHOD, AND COMPUTER PROGRAM PRODUCT FOR USING A CELLULAR PHONE AS AN INTERFACE FOR A VOIP-EQUIPPED COMPUTER

RELATED APPLICATION(S)

The present application claims priority from a provisional application filed Jul. 12, 2004 under application Ser. No. 60/587,343, which is incorporated herein by reference.

BACKGROUND AND FIELD OF THE INVENTION

The present invention relates to VoIP communications, and more particularly to integrating cell phone technology with computer systems equipped with VoIP functionality.

SUMMARY

A system, method and computer program product are provided. Included is a cellular phone capable of communicating via a long-range cellular network protocol and a short-range protocol. Further included is a computer system capable of communicating via a long-range hard-line network protocol and the short-range protocol. Thus, when the cellular phone is in the proximity of the computer system, the cellular phone communicates with the computer system utilizing the short-range protocol, so that the cellular phone is used to communicate via the long-range hard-line communication network protocol.

DETAILED DESCRIPTION

Figure 1:
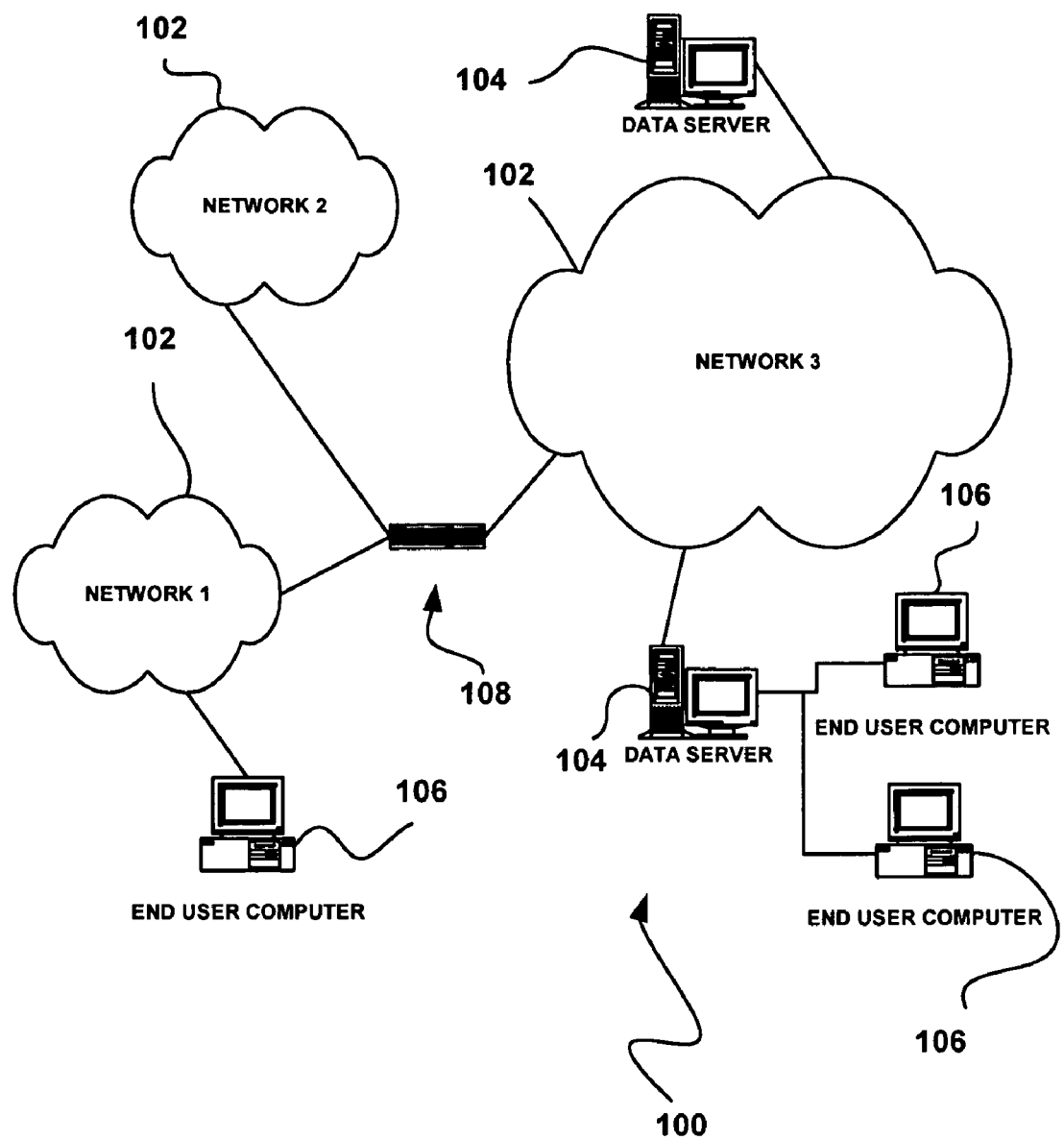
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

Figure 2:
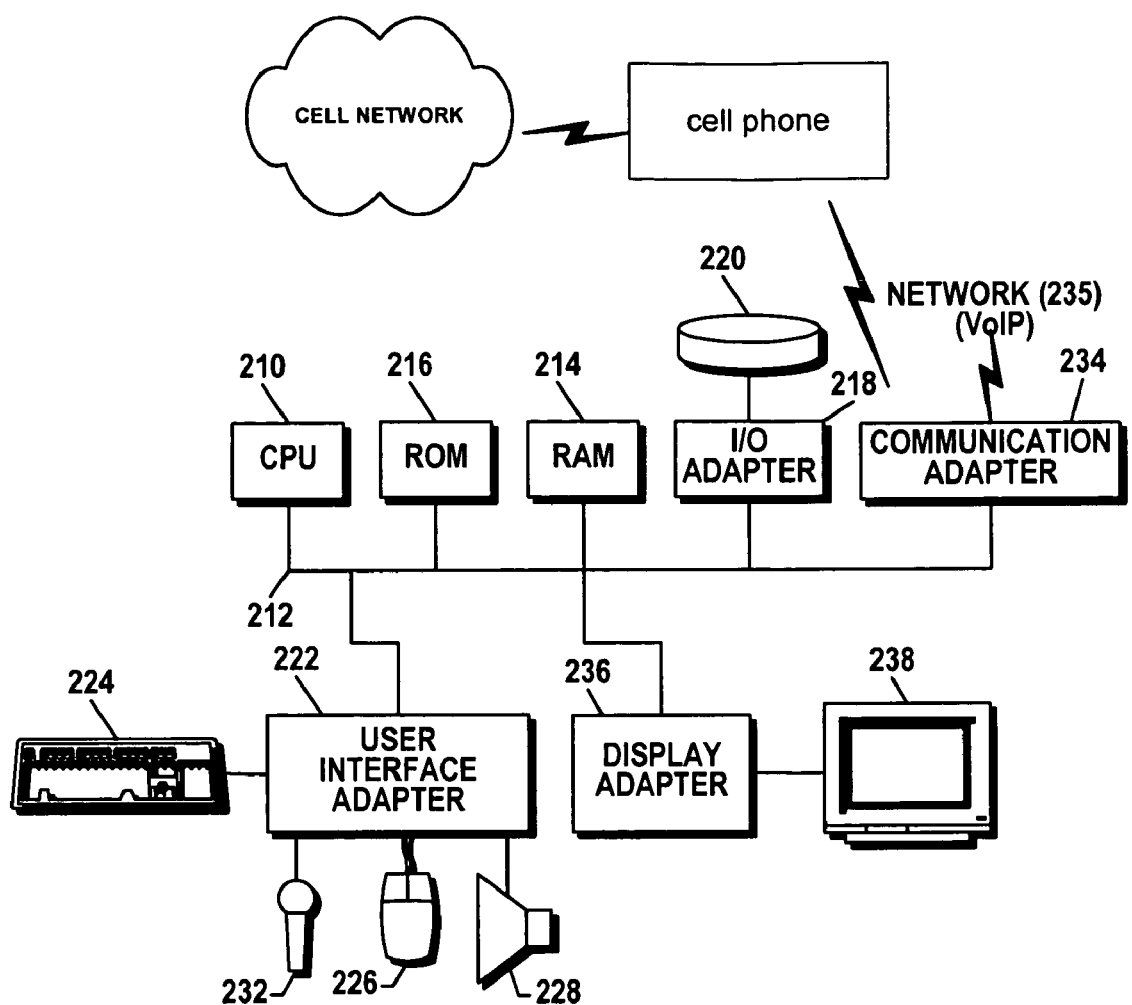
FIG. 2 shows a representative hardware environment that may be associated with the data server computers and/or end user computers of FIG. 1, in accordance with one embodiment.

FIG. 2 shows a representative hardware environment, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network such as the Internet) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Further included is a cellular phone (not numbered) that communicates with the computer as well as a cellular network.

Our course, the various embodiments set forth herein may be implemented utilizing hardware, software, or any desired combination thereof. For that matter, any type of logic may be utilized which is capable of implementing the various functionality set forth herein.

Figure 3:
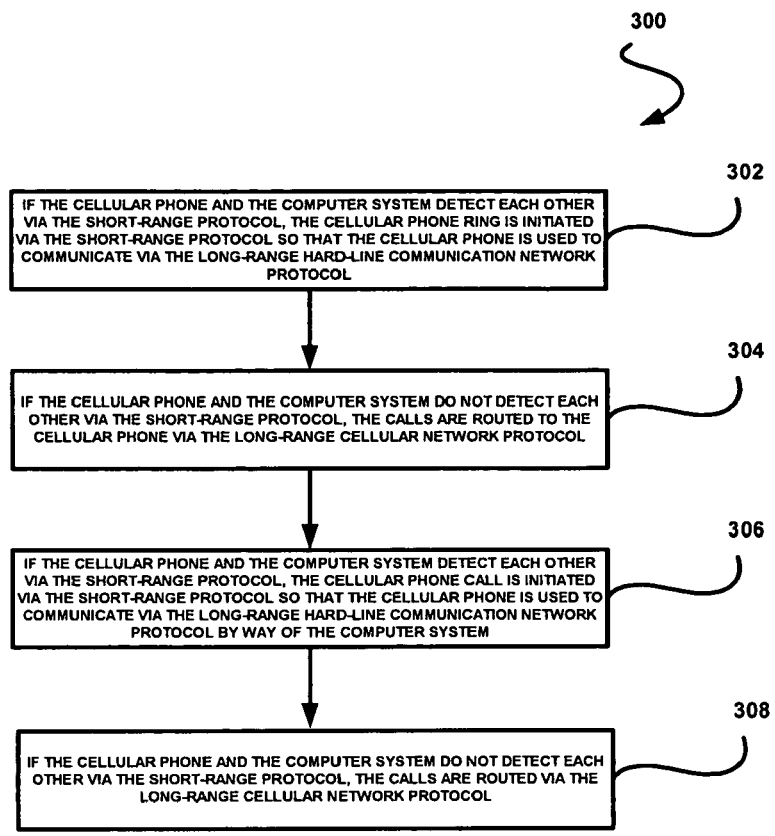
FIG. 3 illustrates a method for converging cell phone use with computer system VoIP use, in accordance with one embodiment.

FIG. 3 illustrates a method 300 for converging cell phone use with computer system VoIP use, in accordance with one embodiment. As an option, the present method 300 may be implemented in the context of the architecture and environment of FIGS. 1 and/or 2. Of course, however, the method 300 may be carried out in any desired environment.

Included is a cellular phone capable of communicating via a long-range cellular network protocol and a short-range protocol. Further included is a computer system capable of communicating via a long-range hard-line network protocol and the short-range protocol. Note, for example, the illustrative architecture of FIGS. 1 and 2.

In one embodiment, the long-range cellular network protocol includes a Global System for Mobile (GSM) protocol, the short-range protocol includes Bluetooth or 802.11 protocol, and the long-range hard-line network protocol includes voice over Internet Protocol (VoIP).

Thus, when the cellular phone is in the proximity of the computer system, the cellular phone communicates with the computer system utilizing the short-range protocol, so that the cellular phone is used to communicate via the long-range hard-line communication network protocol.

As an option, the cellular phone and the computer system may automatically detect each other, and communicate via the short-range protocol upon said detection.

In use, a single phone number may be used in association with the computer system, such that calls are received via the computer system. If the cellular phone and the computer system detect each other via the short-range protocol, the cellular phone ring is initiated via the short-range protocol so that the cellular phone is used to communicate via the long-range hard-line communication network protocol. Note operation 302. If, however, the cellular phone and the computer system do not detect each other via the short-range protocol, the calls are routed to the cellular phone via the long-range cellular network protocol. See operation 304.

Still yet, if the cellular phone and the computer system detect each other via the short-range protocol, the cellular phone call is initiated via the short-range protocol so that the cellular phone is used to communicate via the long-range hard-line communication network protocol by way of the computer system. See operation 306. Finally, if the cellular phone and the computer system do not detect each other via the short-range protocol, the calls are routed via the long-range cellular network protocol. Note operation 308.

As a further option, the computer system may include an interface that is displayed upon said detection. Such interface may indicate details regarding the communication long-range hard-line network protocol.

As yet another option, a cellular phone component such as a cellular phone headset (which is capable of communicating with the cellular phone via the short-range protocol) may further be capable of communicating directly with the computer system via the short-range protocol, to carry out the functionality set forth herein. Of course the various control logic necessary to carry out such functionality may be positioned either in the cellular phone and/or component thereof.

Thus, a speaker or a microphone of the cellular phone may used for communicating using the long-range hard-line network protocol via the computer system, thus obviating the need for a separate speaker or microphone on the computer system. Similarly, a dial pad of the cellular phone may be used for initiating the communications using the long-range hard-line network protocol via the computer system.

To this end, the long-range hard-line network protocol may be used in lieu of long-range cellular network protocol for cost savings, security, and increasing the integrity of the communications.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A system, comprising:
    a cellular phone capable of communicating via a long-range cellular network protocol and a short-range protocol;
    a computer system capable of communicating via a long-range hard-line network protocol and the short-range protocol; and
    a cellular phone headset separate from the cellular phone for communicating with the cellular phone via the short-range protocol, and the cellular phone headset which is separate from the cellular phone further comprising logic positioned therein for communicating directly with the computer system via the short-range protocol without having to be channeled through the cellular phone;
    wherein, when the cellular phone headset is in proximity of the computer system, the cellular phone headset is capable of communicating with the computer system utilizing the short-range protocol, so that the cellular phone headset is used to communicate via the long-range hard-line network protocol;
    wherein the cellular phone headset and the computer system automatically detect each other, and communicate via the short-range protocol upon said detection.

2. The system as recited in claim 1, wherein the computer system includes an interface that is displayed upon said detection.

3. The system as recited in claim 2, wherein the interface indicates details regarding communication via the long-range hard-line network protocol.

4. The system as recited in claim 1, wherein a single phone number is used, such that calls are received, and:
    if the cellular phone headset and the computer system detect each other via the short-range protocol, a ring from the cellular phone headset is initiated via the short-range protocol so that the cellular phone headset is used to communicate via the long-range hard-line network protocol; and
    if the cellular phone headset and the computer system do not detect each other via the short-range protocol, the calls are routed to the cellular phone via the long-range cellular network protocol.

5. The system as recited in claim 1, wherein a single phone number is used, such that calls are sent, and:
    if the cellular phone headset and the computer system detect each other via the short-range protocol, a call from the cellular phone headset is initiated via the short-range protocol so that the cellular phone headset is used to communicate via the long-range hard-line network protocol by way of the computer system; and
    if the cellular phone headset and the computer system do not detect each other via the short-range protocol, the calls are routed via the long-range cellular network protocol.

6. A system, comprising:
    a cellular phone capable of communicating via a long-range cellular network protocol and a short-range protocol;
    a computer system capable of communicating via a long-range hard-line network protocol and the short-range protocol; and
    a cellular phone headset separate from the cellular phone for communicating with the cellular phone via the short-range protocol, and the cellular phone headset which is separate from the cellular phone further comprising logic positioned therein for communicating directly with the computer system via the short-range protocol without having to be channeled through the cellular phone;
    wherein, when the cellular phone headset is in proximity of the computer system, the cellular phone headset is capable of communicating with the computer system utilizing the short-range protocol, so that the cellular phone headset is used to communicate via the long-range hard-line network protocol;
    wherein the system is operable such that communications using the long-range hard-line network protocol via the computer system are initiated manually.

7. An apparatus, comprising:
    a cellular phone headset separate from a cellular phone for communicating with the cellular phone via a short-range protocol, and the cellular phone headset which is separate from the cellular phone further comprising logic positioned therein for communicating with a computer system via the short-range protocol without having to be channeled through the cellular phone, the cellular phone capable of communicating via a long-range cellular network protocol and the short-range protocol, and the computer system capable of communicating via a long-range hard-line network protocol and the short-range protocol;
    wherein the cellular phone headset is operable such that, when the cellular phone headset is in proximity of the computer system, the cellular phone headset is capable of communicating with the computer system utilizing the short-range protocol, so that the cellular phone headset is used to communicate via the long-range hard-line network protocol;

wherein the cellular phone headset is operable such that the cellular phone headset and the computer system automatically detect each other, and communicate via the short-range protocol upon said detection.

8. The apparatus as recited in claim 7, wherein the long-range cellular network protocol includes a Global System for Mobile (GSM) protocol.

9. The apparatus as recited in claim 7, wherein the short-range protocol includes a Bluetooth protocol.

10. The apparatus as recited in claim 7, wherein the long-range hard-line network protocol includes a voice over Internet Protocol (VoIP).

11. The apparatus as recited in claim 7, wherein the short-range protocol includes an 802.11 protocol.

12. The apparatus as recited in claim 7, wherein a dial pad of the cellular phone is used for manually initiating communications using the long-range hard-line network protocol via the computer system.

13. The apparatus as recited in claim 7, wherein the long-range hard-line network protocol is used in lieu of the long-range cellular network protocol for cost savings, security, and increasing integrity of communications.

14. The apparatus as recited in claim 7, wherein the computer system includes an interface that is displayed upon said detection.

15. The apparatus as recited in claim 14, wherein the interface indicates details regarding communication via the long-range hard-line network protocol.

16. The apparatus as recited in claim 7, wherein a single phone number is used, such that calls are received, and:
    if the cellular phone headset and the computer system detect each other via the short-range protocol, a ring from the cellular phone headset is initiated via the short-range protocol so that the cellular phone headset is used to communicate via the long-range hard-line network protocol; and
    if the cellular phone headset and the computer system do not detect each other via the short-range protocol, the calls are routed to the cellular phone via the long-range cellular network protocol.

17. The apparatus as recited in claim 7, wherein a single phone number is used, such that calls are sent, and:
    if the cellular phone headset and the computer system detect each other via the short-range protocol, a call from the cellular phone headset is initiated via the short-range protocol so that the cellular phone headset is used to communicate via the long-range hard-line network protocol by way of the computer system; and
    if the cellular phone headset and the computer system do not detect each other via the short-range protocol, the calls are routed via the long-range cellular network protocol.

18. The apparatus as recited in claim 7, wherein the apparatus is operable such that the cellular phone headset is configured to communicate with both the cellular phone and the computer system.

19. The apparatus as recited in claim 7, wherein the apparatus is operable such that the cellular phone headset is configured to communicate with both the cellular phone and the computer system, and the communication between the cellular phone headset and the computer system is conditioned on said detection.

20. The apparatus as recited in claim 7, wherein the apparatus is operable such that the cellular phone headset is configured to communicate with both the cellular phone and the computer system utilizing the short-range protocol, and an incoming call involving the cellular phone headset is capable of being received via the cellular phone and the long-range cellular network protocol, or the computer system and the long-range hard-line network protocol.

21. The apparatus as recited in claim 7, wherein the apparatus is operable such that the cellular phone headset is configured to communicate with both the cellular phone and the computer system utilizing the short-range protocol, and an outgoing call involving the cellular phone headset is capable of being routed via the cellular phone and the long-range cellular network protocol, or the computer system and the long-range hard-line network protocol.

22. The apparatus as recited in claim 7, wherein the apparatus is operable such that the cellular phone headset is capable of communicating with the cellular phone via the short range protocol as well as the computer system via the short range protocol if the cellular phone headset and the computer system detect each other.

23. The apparatus as recited in claim 7, wherein the apparatus is operable such that the cellular phone headset is capable of communicating with the cellular phone via the short range protocol as well as and the computer system via the short range protocol if the cellular phone and the computer system detect each other.

24. An apparatus, comprising:
    a cellular phone headset separate from a cellular phone for communicating with the cellular phone via a short-range protocol, and the cellular phone headset which is separate from the cellular phone further comprising logic positioned therein for communicating with a computer system via the short-range protocol without having to be channeled through the cellular phone, the cellular phone capable of communicating via a long-range cellular network protocol and the short-range protocol, and the computer system capable of communicating via a long-range hard-line network protocol and the short-range protocol;
    wherein the cellular phone headset is operable such that, when the cellular phone headset is in proximity of the computer system, the cellular phone headset is capable of communicating with the computer system utilizing the short-range protocol, so that the cellular phone headset is used to communicate via the long-range hard-line network protocol;
    wherein the cellular phone headset is operable such that communications using the long-range hard-line network protocol via the computer system are initiated manually.

25. A system, comprising: the apparatus of claim 24 and a cellular phone, wherein the apparatus and the cellular phone are configured to communicate via the short-range protocol including a Bluetooth protocol, wherein the cellular phone is also configured to communicate via the long-range cellular network protocol and the short-range protocol.

26. A system, comprising: the apparatus of claim 24 and a computer system, wherein the logic is capable of communicating directly with the computer system via the short-range protocol, and wherein the computer system is also configured to communicate via the long-range hard-line network protocol and the short-range protocol.

27. A system, comprising: the apparatus of claim 24, a cellular phone, wherein the apparatus and cellular phone are configured to communicate via the short-range protocol including a Bluetooth protocol, wherein the cellular phone is also configured to communicate via the long-range cellular network protocol and the short-range protocol, and the computer system, wherein the logic is capable of communicating directly with the computer system via the short-range protocol, and wherein the computer system is also configured to communicate via the long-range hard-line network protocol and the short-range protocol.

28. A system, comprising: the apparatus of claim 24, a cellular phone and a computer system, wherein the apparatus, the cellular phone, and the computer system are operable such that a dial pad of the cellular phone is capable used for initiating the communications using the long-range hard-line network protocol via the computer system.

29. The apparatus as recited in claim 24, wherein the long-range hard-line network protocol is a wired Internet Protocol.

30. The apparatus as recited in claim 24, wherein the long-range hard-line network protocol includes a wired Internet Protocol.

31. A system, comprising: the apparatus of claim 24, a cellular phone and a computer system, wherein the apparatus, the cellular phone, and the computer system are operable such that a speaker and a microphone of the cellular phone headset are used for communicating using the long-range hard-line network protocol via the computer system, thus obviating a need for a separate speaker and a separate microphone with the computer system.

32. The apparatus as recited in claim 24, wherein the apparatus is operable such that the cellular phone headset is configured to communicate with both the cellular phone and the computer system.

33. The apparatus as recited in claim 24, wherein the apparatus is operable such that the cellular phone headset is operable such that the cellular phone headset and the computer system automatically detect each other, and communicate via the short-range protocol upon said detection, and the cellular phone headset is configured to communicate with both the cellular phone and the computer system, and the communication between the cellular phone headset and the computer system is conditioned on said detection.

34. The apparatus as recited in claim 24, wherein the apparatus is operable such that the cellular phone headset is configured to communicate with both the cellular phone and the computer system utilizing the short-range protocol, and an incoming call involving the cellular phone headset is capable of being received via the cellular phone and the long-range cellular network protocol, or the computer system and the long-range hard-line network protocol.

35. The apparatus as recited in claim 24, wherein the apparatus is operable such that the cellular phone headset is configured to communicate with both the cellular phone and the computer system utilizing the short-range protocol, and an outgoing call involving the cellular phone headset is capable of being routed via the cellular phone and the long-range cellular network protocol, or the computer system and the long-range hard-line network protocol.

36. The apparatus as recited in claim 24, wherein the apparatus is operable such that the cellular phone headset is capable of communicating with the cellular phone via the short range protocol as well as the computer system via the short range protocol if the cellular phone headset and the computer system detect each other.

37. The apparatus as recited in claim 24, wherein the apparatus is operable such that the cellular phone headset is capable of communicating with the cellular phone via the short range protocol as well as and the computer system via the short range protocol if the cellular phone and the computer system detect each other.

38. A method, comprising:
communicating with a cellular phone via a short-range protocol utilizing a cellular phone headset separate from the cellular phone, the cellular phone headset separate from the cellular phone comprising logic positioned therein for further communicating with a computer system via the short-range protocol without having to be channeled through the cellular phone, the cellular phone capable of communicating via a long-range cellular network protocol and the short-range protocol, and the computer system capable of communicating via a long-range hard-line network protocol and the short-range protocol;
the cellular phone headset operable such that, when the cellular phone headset is in proximity of the computer system, the cellular phone headset is capable of communicating with the computer system utilizing the short-range protocol, so that the cellular phone headset is used to communicate via the long-range hard-line network protocol;
wherein the cellular phone headset and the computer system automatically detect each other, and communicate via the short-range protocol upon said detection.

39. The method as recited in claim 38, wherein the long-range cellular network protocol includes a Global System for Mobile (GSM) protocol.

40. The method as recited in claim 38, wherein the short-range protocol includes a Bluetooth protocol.

41. The method as recited in claim 38, wherein the long-range hard-line network protocol includes a voice over Internet Protocol (VoIP).

42. The method as recited in claim 38, wherein the short-range protocol includes an 802.11 protocol.

43. The method as recited in claim 38, wherein a dial pad of the cellular phone is used for manually initiating communications using the long-range hard-line network protocol via the computer system.

44. The method as recited in claim 38, wherein the long-range hard-line network protocol is used in lieu of the long-range cellular network protocol for cost savings, security, and increasing integrity of communications.

45. The method as recited in claim 38, wherein the computer system includes an interface that is displayed upon said detection.

46. The method as recited in claim 45, wherein the interface indicates details regarding communication via the long-range hard-line network protocol.

47. The method as recited in claim 38, wherein a single phone number is used, such that calls are received, and:
if the cellular phone headset and the computer system detect each other via the short-range protocol, a ring from the cellular phone headset is initiated via the short-range protocol so that the cellular phone headset is used to communicate via the long-range hard-line network protocol; and
if the cellular phone headset and the computer system do not detect each other via the short-range protocol, the calls are routed to the cellular phone via the long-range cellular network protocol.

48. The method as recited in claim 38, wherein a single phone number is used, such that calls are sent, and:
if the cellular phone headset and the computer system detect each other via the short-range protocol, a call from the cellular phone headset is initiated via the short-range protocol so that the cellular phone headset is used to communicate via the long-range hard-line network protocol by way of the computer system; and if the cellular phone headset and the computer system do not detect each other via the short-range protocol, the calls are routed via the long-range cellular network protocol.

49. The method as recited in claim 38, wherein the cellular phone headset is configured to communicate with both the cellular phone and the computer system.

50. The method as recited in claim 38, wherein the cellular phone headset is configured to communicate with both the cellular phone and the computer system, and the communication between the cellular phone headset and the computer system is conditioned on said detection.

51. The method as recited in claim 38, wherein the cellular phone headset is configured to communicate with both the cellular phone and the computer system utilizing the short-range protocol, and an incoming call involving the cellular phone headset is capable of being received via the cellular phone and the long-range cellular network protocol, or the computer system and the long-range hard-line network protocol.

52. The method as recited in claim 38, wherein the cellular phone headset is configured to communicate with both the cellular phone and the computer system utilizing the short-range protocol, and an outgoing call involving the cellular phone headset is capable of being routed via the cellular phone and the long-range cellular network protocol, or the computer system and the long-range hard-line network protocol.

53. The method as recited in claim 38, wherein the cellular phone headset is capable of communicating with the cellular phone via the short range protocol as well as the computer system via the short range protocol if the cellular phone headset and the computer system detect each other.

54. The method as recited in claim 38, wherein the cellular phone headset is capable of communicating with the cellular phone via the short range protocol as well as and the computer system via the short range protocol if the cellular phone and the computer system detect each other.

55. A method, comprising:
communicating with a cellular phone via a short-range protocol utilizing a cellular phone headset separate from the cellular phone, the cellular phone headset separate from the cellular phone comprising logic positioned therein for further communicating with a computer system via the short-range protocol without having to be channeled through the cellular phone, the cellular phone capable of communicating via a long-range cellular network protocol and the short-range protocol, and the computer system capable of communicating via a long-range hard-line network protocol and the short-range protocol;
wherein the cellular phone headset is operable such that, when the cellular phone headset is in proximity of the computer system, the cellular phone headset is capable of communicating with the computer system utilizing the short-range protocol, so that the cellular phone headset is used to communicate via the long-range hard-line network protocol;
wherein communications using the long-range hard-line network protocol via the computer system are initiated manually.

56. The method as recited in claim 55, wherein the cellular phone headset is configured to communicate with both the cellular phone and the computer system.

57. The method as recited in claim 55, wherein the cellular phone headset is operable such that the cellular phone headset and the computer system automatically detect each other, and communicate via the short-range protocol upon said detection, and the cellular phone headset is configured to communicate with both the cellular phone and the computer system, and the communication between the cellular phone headset and the computer system is conditioned on said detection.

58. The method as recited in claim 55, wherein the cellular phone headset is configured to communicate with both the cellular phone and the computer system utilizing the short-range protocol, and an incoming call involving the cellular phone headset is capable of being received via the cellular phone and the long-range cellular network protocol, or the computer system and the long-range hard-line network protocol.

59. The method as recited in claim 55, wherein the cellular phone headset is configured to communicate with both the cellular phone and the computer system utilizing the short-range protocol, and an outgoing call involving the cellular phone headset is capable of being routed via the cellular phone and the long-range cellular network protocol, or the computer system and the long-range hard-line network protocol.

60. The method as recited in claim 55, wherein the cellular phone headset is capable of communicating with the cellular phone via the short range protocol as well as the computer system via the short range protocol if the cellular phone headset and the computer system detect each other.

61. The method as recited in claim 55, wherein the cellular phone headset is capable of communicating with the cellular phone via the short range protocol as well as and the computer system via the short range protocol if the cellular phone and the computer system detect each other.

62. A computer program product embodied on a non-transitory computer readable medium, comprising:
computer code for controlling a cellular phone headset separate from a cellular phone for communicating with the cellular phone via a short-range protocol, and the cellular phone headset which is separate from the cellular phone further comprising logic positioned therein for communicating with a computer system via the short-range protocol without having to be channeled through the cellular phone, the cellular phone capable of communicating via a long-range cellular network protocol and the short-range protocol, and the computer system capable of communicating via a long-range hard-line network protocol and the short-range protocol; and
computer code for controlling the cellular phone headset such that, when the cellular phone headset is in proximity of the computer system, the cellular phone headset is capable of communicating with the computer system utilizing the short-range protocol, so that the cellular phone headset is used to communicate via the long-range hard-line network protocol;
wherein the computer program product is operable such that: the cellular phone headset and the computer system automatically detect each other and communicate via the short-range protocol after said detection, communications using the long-range hard-line network protocol via the computer system are capable of being controlled manually utilizing the cellular phone headset, and an indicator is displayed after said detection.

63. The computer program product as recited in claim 62, wherein the computer program product is operable such that the cellular phone headset is configured to communicate with both the cellular phone and the computer system.

64. The computer program product as recited in claim 62, wherein the computer program product is operable such that the cellular phone headset is configured to communicate with both the cellular phone and the computer system, and the communication between the cellular phone headset and the computer system is conditioned on said detection.

65. The computer program product as recited in claim 62, wherein the computer program product is operable such that the cellular phone headset is configured to communicate with both the cellular phone and the computer system utilizing the short-range protocol, and an incoming call involving the cellular phone headset is capable of being received via the cellular phone and the long-range cellular network protocol, or the computer system and the long-range hard-line network protocol.

66. The computer program product as recited in claim 62, wherein the computer program product is operable such that the cellular phone headset is configured to communicate with both the cellular phone and the computer system utilizing the short-range protocol, and an outgoing call involving the cellular phone headset is capable of being routed via the cellular phone and the long-range cellular network protocol, or the computer system and the long-range hard-line network protocol.

67. The computer program product as recited in claim 62, wherein the computer program product is operable such that the cellular phone headset is capable of communicating with the cellular phone via the short range protocol as well as the computer system via the short range protocol if the cellular phone headset and the computer system detect each other.

68. The computer program product as recited in claim 62, wherein the computer program product is operable such that the cellular phone headset is capable of communicating with the cellular phone via the short range protocol as well as and the computer system via the short range protocol if the cellular phone and the computer system detect each other.

69. An apparatus, comprising:
a cellular phone headset separate from a cellular phone for communicating with the cellular phone via a short-range protocol including a Bluetooth protocol, and the cellular phone headset which is separate from the cellular phone further comprising logic positioned therein for communicating with a system via the short-range protocol without having to be channeled through the cellular phone, the cellular phone capable of communicating via a long-range cellular network protocol and the short-range protocol, and the system capable of communicating via a long-range hard-line network protocol and the short-range protocol;
the cellular phone headset operable such that, when the cellular phone headset is in proximity of the system, the cellular phone headset is capable of communicating with the system utilizing the short-range protocol, so that the cellular phone headset is used to communicate via the long-range hard-line network protocol; and
an indicator that is displayed upon the cellular phone headset automatically detecting the system.

70. The apparatus as recited in claim 69, wherein the indicator includes an interface.

71. The apparatus as recited in claim 70, wherein the interface indicates details regarding communication via the long-range hard-line network protocol.

72. The apparatus as recited in claim 69, wherein the indicator is connected to the system.

73. The apparatus as recited in claim 69, wherein the cellular phone headset communicates via the short-range protocol upon said detection.

74. The apparatus as recited in claim 69, wherein the apparatus is operable such that the cellular phone headset is configured to communicate with both the cellular phone and the system.

75. The apparatus as recited in claim 69, wherein the apparatus is operable such that the cellular phone headset is configured to communicate with both the cellular phone and the system, and the communication between the cellular phone headset and the system is conditioned on said detection.

76. The apparatus as recited in claim 69, wherein the apparatus is operable such that the cellular phone headset is configured to communicate with both the cellular phone and the system utilizing the short-range protocol, and an incoming call involving the cellular phone headset is capable of being received via the cellular phone and the long-range cellular network protocol, or the system and the long-range hard-line network protocol.

77. The apparatus as recited in claim 69, wherein the apparatus is operable such that the cellular phone headset is configured to communicate with both the cellular phone and the system utilizing the short-range protocol, and an outgoing call involving the cellular phone headset is capable of being routed via the cellular phone and the long-range cellular network protocol, or the system and the long-range hard-line network protocol.

78. The apparatus as recited in claim 69, wherein the apparatus is operable such that the cellular phone headset is capable of communicating with the cellular phone via the short range protocol as well as the system via the short range protocol if the cellular phone headset and the system detect each other.

79. The apparatus as recited in claim 69, wherein the apparatus is operable such that the cellular phone headset is capable of communicating with the cellular phone via the short range protocol as well as and the system via the short range protocol if the cellular phone and the system detect each other.

80. An apparatus, comprising:
a cellular phone headset separate from a cellular phone for communicating with the cellular phone via a short-range protocol including a Bluetooth protocol, and the cellular phone headset which is separate from the cellular phone further comprising logic positioned therein for communicating with a system via the short-range protocol without having to be channeled through the cellular phone, the cellular phone capable of communicating via a long-range cellular network protocol and the short-range protocol, and the system capable of communicating via a long-range hard-line network protocol and the short-range protocol;
wherein the cellular phone headset is operable such that, when the cellular phone headset is in proximity of the system, the cellular phone headset is capable of communicating with the system utilizing the short-range protocol, so that the cellular phone headset is used to communicate via the long-range hard-line network protocol;
wherein the cellular phone headset is operable such that communications using the long-range hard-line network protocol via the system are controlled manually, utilizing the cellular phone headset.

81. The apparatus as recited in claim 80, wherein the apparatus is operable such that the cellular phone headset is configured to communicate with both the cellular phone and the system.

82. The apparatus as recited in claim 80, wherein the apparatus is operable such that the cellular phone headset is operable such that the cellular phone headset and the system automatically detect each other, and communicate via the short-range protocol upon said detection, and the cellular phone headset is configured to communicate with both the cellular phone and the system, and the communication between the cellular phone headset and the system is conditioned on said detection.

83. The apparatus as recited in claim 80, wherein the apparatus is operable such that the cellular phone headset is configured to communicate with both the cellular phone and the system utilizing the short-range protocol, and an incoming call involving the cellular phone headset is capable of being received via the cellular phone and the long-range cellular network protocol, or the system and the long-range hard-line network protocol.

84. The apparatus as recited in claim 80, wherein the apparatus is operable such that the cellular phone headset is configured to communicate with both the cellular phone and the system utilizing the short-range protocol, and an outgoing call involving the cellular phone headset is capable of being routed via the cellular phone and the long-range cellular network protocol, or the system and the long-range hard-line network protocol.

85. The apparatus as recited in claim 80, wherein the apparatus is operable such that the cellular phone headset is capable of communicating with the cellular phone via the short range protocol as well as the system via the short range protocol if the cellular phone headset and the system detect each other.

86. The apparatus as recited in claim 80, wherein the apparatus is operable such that the cellular phone headset is capable of communicating with the cellular phone via the short range protocol as well as and the system via the short range protocol if the cellular phone and the system detect each other.

87. An apparatus, comprising:
a cellular phone headset separate from a cellular phone for communicating with the cellular phone via a short-range protocol including a Bluetooth protocol, and the cellular phone headset which is separate from the cellular phone further comprising logic positioned therein for communicating with a system via the short-range protocol without having to be channeled through the cellular phone, the cellular phone capable of communicating via a long-range cellular network protocol and the short-range protocol, and the system capable of communicating via a long-range hard-line network protocol and the short-range protocol;
the cellular phone headset including control logic for controlling the communication with the system such that, when the cellular phone headset is in proximity of the system, the cellular phone headset is capable of communicating with the system utilizing the short-range protocol, so that the cellular phone headset is used to communicate via the long-range hard-line network protocol; and
an indicator connected to the system, the indicator being displayed upon the cellular phone headset automatically detecting the system.

88. The apparatus as recited in claim 87, wherein the indicator includes an interface.

89. The apparatus as recited in claim 87, wherein the cellular phone headset communicates via the short-range protocol upon said detection.

90. The apparatus as recited in claim 87, wherein communications using the long-range hard-line network protocol via the system are controlled manually, utilizing the cellular phone headset.

91. The apparatus as recited in claim 87, wherein the long-range hard-line network protocol includes a voice over Internet Protocol (VoIP).

92. The apparatus as recited in claim 87, wherein the apparatus is operable such that the cellular phone headset is configured to communicate with both the cellular phone and the system.

93. The apparatus as recited in claim 87, wherein the apparatus is operable such that the cellular phone headset is configured to communicate with both with the cellular phone and the system, and the communication between the cellular phone headset and the system is conditioned on said detection.

94. The apparatus as recited in claim 87, wherein the apparatus is operable such that the cellular phone headset is configured to communicate with both the cellular phone and the system utilizing the short-range protocol, and an incoming call involving the cellular phone headset is capable of being received via the cellular phone and the long-range cellular network protocol, or the system and the long-range hard-line network protocol.

95. The apparatus as recited in claim 87, wherein the apparatus is operable such that the cellular phone headset is configured to communicate with both the cellular phone and the system utilizing the short-range protocol, and an outgoing call involving the cellular phone headset is capable of being routed via the cellular phone and the long-range cellular network protocol, or the system and the long-range hard-line network protocol.

96. The apparatus as recited in claim 87, wherein the apparatus is operable such that the cellular phone headset is capable of communicating with the cellular phone via the short range protocol as well as the system via the short range protocol if the cellular phone headset and the system detect each other.

97. The apparatus as recited in claim 87, wherein the apparatus is operable such that the cellular phone headset is capable of communicating with the cellular phone via the short range protocol as well as and the system via the short range protocol if the cellular phone and the system detect each other.

* * * * *